United States Patent
Hupp (10) Patent No.: US 7,631,912 B2
(45) Date of Patent: Dec. 15, 2009

(54) LIFTING DEVICE FOR A VACUUM TRANSFER SYSTEM

(75) Inventor: Evan Lee Hupp, Ely, IA (US)

(73) Assignee: Evergreen Packaging Inc., Memphis, TN (US)

( * ) Notice: Subject to any disclaimer, the term of this patent is extended or adjusted under 35 U.S.C. 154(b) by 0 days.

(21) Appl. No.: 11/831,266

(22) Filed: Jul. 31, 2007

(65) Prior Publication Data

US 2009/0033111 A1 Feb. 5, 2009

(51) Int. Cl.
*B66C 1/02* (2006.01)
*F16J 15/10* (2006.01)

(52) U.S. Cl. .................... 294/64.1; 277/650
(58) Field of Classification Search ............. 294/64.1; 277/650
See application file for complete search history.

(56) References Cited

U.S. PATENT DOCUMENTS

| | | | |
|---|---|---|---|
| 1,990,334 A | 2/1935 | Koppe | |
| 3,934,916 A | 1/1976 | Baker | |
| 4,529,353 A * | 7/1985 | Dean et al. | ................ 294/64.1 |
| 4,564,188 A | 1/1986 | McNair | |
| 4,589,648 A | 5/1986 | Hancock | |
| 4,606,867 A * | 8/1986 | Eguchi | .................. 261/122.1 |
| 4,674,784 A | 6/1987 | Wooley | |
| 4,763,941 A * | 8/1988 | Sniderman | ................ 294/64.1 |
| 6,024,392 A | 2/2000 | Blatt | |
| 6,364,386 B1 * | 4/2002 | Quick et al. | .............. 294/64.1 |
| 6,394,520 B1 * | 5/2002 | Quick et al. | .............. 294/64.1 |
| 6,502,877 B2 | 1/2003 | Schick et al. | |
| 6,979,032 B2 | 12/2005 | Damhuis | |
| 7,000,964 B1 | 2/2006 | Porras et al. | |
| 7,028,617 B2 | 4/2006 | Shibabuki et al. | |
| 7,100,955 B2 | 9/2006 | Nakamura | |
| 7,374,217 B2 * | 5/2008 | Pabst | ........................ 294/64.1 |
| 2002/0011735 A1 | 1/2002 | Nagai et al. | |

OTHER PUBLICATIONS

© ANVER Corp., ANVER Vacuum Cups and Suction Cups, Model P-35 CUP & VALVE, Part No. A-3350038; www.anver.com, pp. 1-2; printed Mar. 26, 2007.
© ANVER Corp., ANVER Vacuum Cups and Suction Cups, Model P-35 CUP & FITTING, Part No. A-3350045; www.anver.com, pp. 1-2; printed Mar. 26, 2007.
© ANVER Corp., ANVER Vacuum Cups and Suction Cups, Model OP-20x100 CUP & SEAL, Part No. A-3350050; www.anver.com, pp. 1-2; printed Mar. 26, 2007.
© ANVER Corp., ANVER Vacuum Cups and Suction Cups, Model P-35 SEALING RING, Part No. A-3350023; www.anver.com, pp. 1-2; printed Mar. 26, 2007.
Schmalz VacuWorld, Model SPK 45 CR-20 G1/4-IG, Article No. 10.01.01.10559; www.vacuworld.com, pp. 1; printed Mar. 26, 2007.

* cited by examiner

*Primary Examiner*—Paul T Chin
(74) *Attorney, Agent, or Firm*—Daniel F. Nesbitt; Hasse & Nesbitt LLC (57) ABSTRACT

An improved lifting device for a vacuum transfer system has an elastomeric gasket that provides a contact area which has a large cross-sectional area and is more stable and longer lasting than prior art devices. The elastomeric gasket is typically retained in a housing where vacuum can be supplied to the inside thereof. The Elastomeric gasket, providing a contact surface that is flexible yet strong and having a larger contact area than the lip of a typical suction cup, provides an improved seal between the pick-up device and the article to be moved and a longer period of time before the contact surface needs to be replaced.

19 Claims, 8 Drawing Sheets

LIFTING DEVICE FOR A VACUUM TRANSFER SYSTEM

FIELD OF THE INVENTION

The present invention relates in general to vacuum transfer systems, and in particular to an improved lifting device for a vacuum transfer system.

BACKGROUND OF THE INVENTION

Vacuum transfer systems, so-called "pick and place" systems or vacuum pickup devices, have various uses. For example, a vacuum transfer system can be utilized to transfer components from a first station to a second station, such as in an assembly line or packaging process, or to manipulate components in a manufacturing environment, such as in the microelectronics industry.

In a vacuum transfer system, a suction cup is typically present on the end of a robotic arm which physically touches the objects that are manipulated, e.g., the suction cup is manipulated to contact an object, forms a vacuum seal with the object, and then is manipulated to transfer the object to a second location. Both the efficiency and component throughput of a vacuum transfer system can be improved by increasing the rate of transfer of the objects. However, an increase in the transfer rate is accompanied by an increase in the operating speed of the vacuum transfer system. Accordingly, an increase in the speed increases the contact velocity of the suction cup to the object, which can produce a higher impact force on the object, leading to increased failure rates and/or breakage of the suction cup. Thus, in vacuum transfer processes, it is desirable to be able to increase the vacuum transfer rate and object throughput while also minimizing the failure rate and incidence of breakage.

Typical prior art suction cups are of various flexible materials (natural rubber, silicone, Viton®, urethane, flexible polyvinylchloride (PVC), or an equivalent flexible element), and have a thin flexible lip that comes in contact with the article to be moved. Typically a vacuum is applied to the cavity formed by contact of the suction cup with the article to be moved, and the vacuum then creates a vacuum attachment force that allows the article to be picked up or moved. The repetitive action of the lip of the suction cup, i.e. flexing and rubbing against the article to be moved, wears down the surface of the suction cup over time. Since the skirt of the suction cup typically has a thin flexible cross-section, wear-and-tear on the surface of the suction cup's lip soon causes buckling and tearing of the skirt and contact points, such that the seal between the cup and the article to be moved is diminished. This diminished seal causes a failure of the cup to apply the necessary moving or pick-up force to the article to be moved, typically causing an air leak across the lip of the suction cup. Leaks which develop typically require the suction cups to be replaced over time so that the device can continue to operate consistently and correctly.

The prior art includes various patents disclosing efforts to improve the science of vacuum pick-up devices. Patents considered to be most relevant to the present invention are summarized as follows:

U.S. Pat. No. 5,752,729 to Crozier et al. discloses a specialized suction cup for a vacuum lifting device for lifting heavy objects such as slabs. The suction cup has a double seal design that includes a soft outer seal made of a closed cell polyurethane rubber and a harder inner seal made from rubber. The harder inner seal is intended to reduce wear and tear on the outer seal, and to provide a backup seal for lifting the heavy slabs.

U.S. Pat. No. 7,028,617 to Shibabuki et al. discloses a printing plate sucker capable of stably suction-adhering and sheet-feeding both a printing plate and a protective sheet at the same time, without causing wrinkling of the protective sheet during vacuum pickup. The sucker has a skirt portion formed of a resilient body with flat, thick walls that are capable of closely corresponding with the protective sheet for suction-adherence of the printing plate.

U.S. Pat. No. 6,154,929 to Dwyer discloses a moveable suction cup-mounted holder having a pair of suction cups with enhanced gripping power to hold onto the exterior hull of a watercraft, such as a boat. The suction cups include an O-ring positioned on the outermost peripheral edge of the suction cup in order to increase the volumetric capacity of the cup portion and therefore increase the strength of the vacuum that holds the suction cup to the hull of the boat.

Vacuum cups available from Anver (Hudson, Mass.) are made from a rigid plastic molded in a fixed, regular shape, typically round or oval, with a flexible ethylene-propylene sealing ring having a flange with an annular groove that conforms to corresponding annular rim in the vacuum cup.

While these prior art suction cup devices are useful for their intended purposes, a continuing need exists for a lifting device with a seal-forming (article-contacting) means that replaces the conventional suction cup portion of a vacuum transport system.

SUMMARY OF THE INVENTION

In light of the foregoing, the present invention helps address the problem of wear and tear that occurs with suction cups for vacuum pickup devices by providing a lifting device with a seal-forming (article-contacting) means that replaces the conventional suction cup portion of a vacuum transport system.

A first aspect of the invention provides a lifting device for use in transferring an article, comprising (a) an external housing including a passage, an inner surface, an inner wall and a distal end, the passage extending through the external housing for connection to a negative pressure supply source that applies a vacuum attachment force, the inner surface and inner wall defining a vacuum compartment in fluid communication with the passage; (b) an internal housing including an outer surface, the internal housing associated with the external housing within the vacuum compartment to define a groove circuit therebetween; and (c) an elastomeric gasket securable within the groove circuit and including a contact surface that protrudes axially beyond the distal end of the external housing for making contact with an article to be transferred under the vacuum attachment force.

A second aspect of the invention provides a lifting device for use in transferring an article, comprising (a) an external housing including a passage extending therethrough for connection to a negative pressure supply source, an inner surface, an inner wall and a distal end, the negative pressure supply source adapted to apply a vacuum attachment force, the inner surface and inner wall defining a vacuum compartment in fluid communication with the passage; (b) an internal housing including an outer surface, the internal housing associated with the external housing within the vacuum compartment to define a groove circuit therebetween; and (c) an elastomeric gasket securable within the groove circuit and including a contact surface that protrudes axially beyond the distal end of the external housing for making contact with an article to be transferred under the vacuum attachment force, wherein the elastomeric gasket is adapted to provide a vacuum area in response to application of the vacuum attachment force by the negative pressure supply source.

A third aspect of the invention provides a lifting device for transferring articles, the lifting device comprising: (a) a unitary housing structure including a groove circuit, a distal end and a passage, the passage extending through the unitary housing structure for connection to a negative pressure supply source, the negative pressure supply source adapted to apply a vacuum attachment force; and (b) an elastomeric gasket securable within the groove circuit and including a contact surface that protrudes axially beyond the distal end of the unitary housing structure for making contact with an article to be transferred under the vacuum attachment force.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

Figure 1:
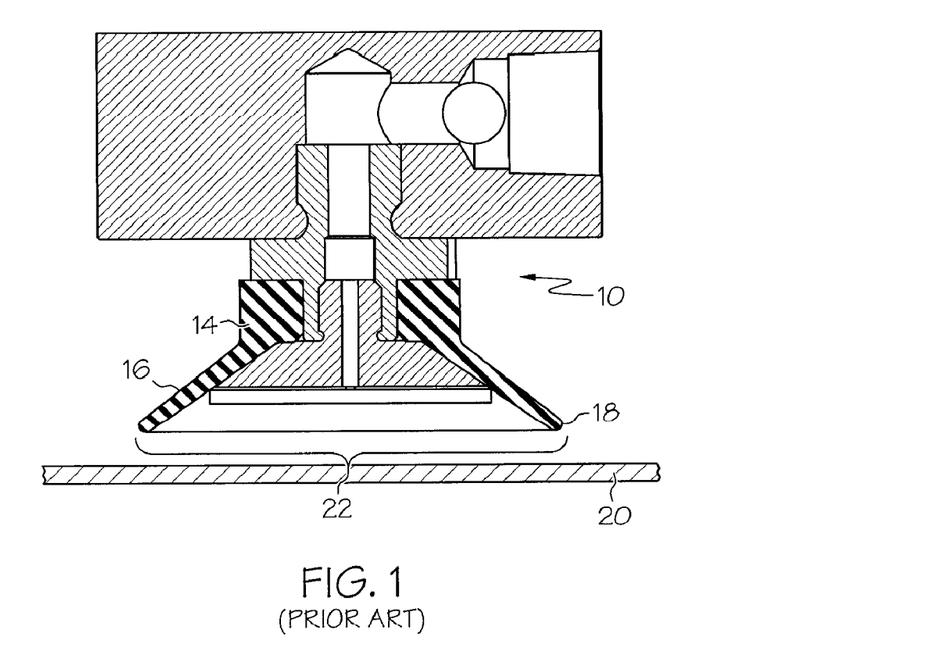
FIG. 1 is a cross-sectional schematic illustration of a prior art lifting device prior to contact with an article to be moved.

Lifting devices in the form of a suction cup have previously been used in order to attract and transport an article under the action of a negative pressure. As shown in FIG. 1, a conventional prior art suction cup comprises a main cup body 10 including a base section 14 and a skirt section 16 which are integrally formed with a flexible material such as rubber. The skirt section 16 has a thin flexible lip portion 18 that typically comes in contact with the article 20 to be moved and bends upon contact with the article. Typically a vacuum is applied to the cavity formed by contact of the suction cup 10 with the article 20 to be moved, and the vacuum then creates a vacuum attachment force that allows the article 20 to be picked up or moved. The repetitive action of the lip portion 18 of the suction cup 10, i.e. flexing and rubbing against the article 20, wears down the lip portion 18 of the suction cup over time.

Figure 2:
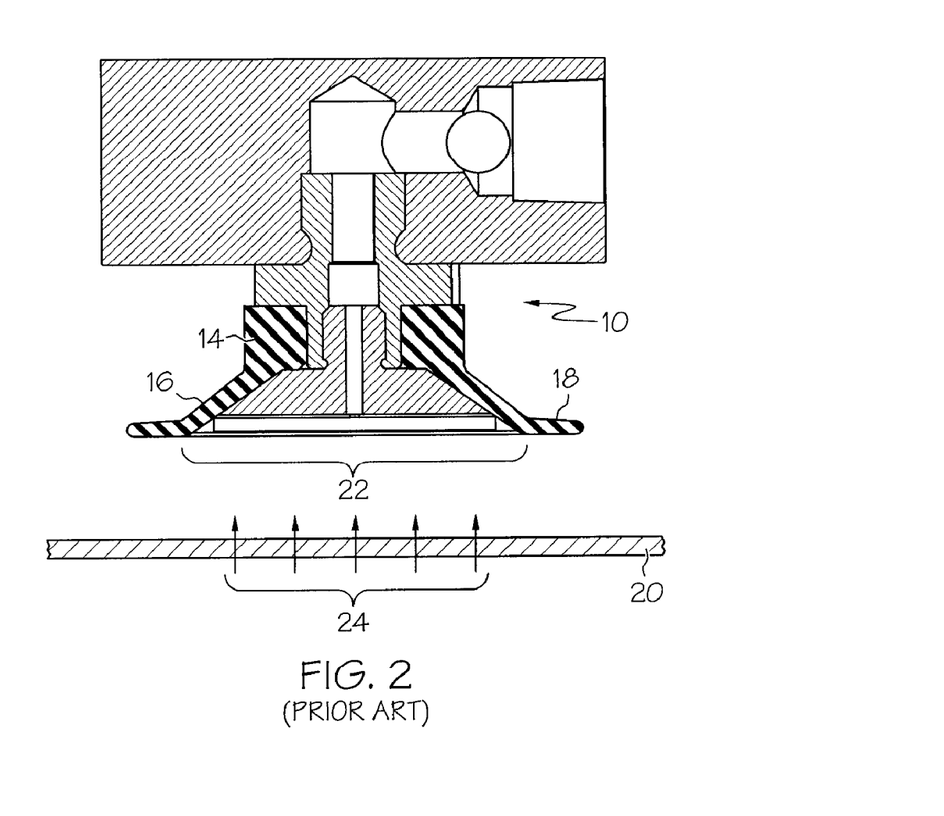
FIG. 2 is a cross-sectional schematic illustration of the prior art device of FIG. 1 during contact with the article to be moved.

FIG. 2 illustrates that when a vacuum (a vacuum is the absence of pressure or negative pressure) or vacuum attachment force 24 is applied to the lip portion 18 of the prior art suction cup 10, the lip portion 18 collapses somewhat against the article 20 to be moved under the force 24 exerted by the vacuum. Over time, this repeated collapse causes the vacuum area 22 under the suction cup to be reduced in size, as compared to the vacuum area 22 illustrated in FIG. 1. This reduced vacuum area 22 leads to a decreased area of vacuum attachment force 24 between the cup 10 and the article 20.

Because the lip portion 18 typically has a thin, flexible cross-section, repeated collapsing and wear-and-tear on the surface of the lip portion 18 causes the seal between the cup 10 and the article 20 to diminish over time. This diminished seal further decreases the vacuum attachment force 24, and causes a failure of the cup 10 to apply the necessary moving or pick-up force to the article to be moved, typically causing an air leak across the lip portion 18 of the suction cup 10. Leaks which develop typically require the rubber elements of the suction cup to be replaced over time, so that the device can continue to operate consistently and correctly.

Figure 3:
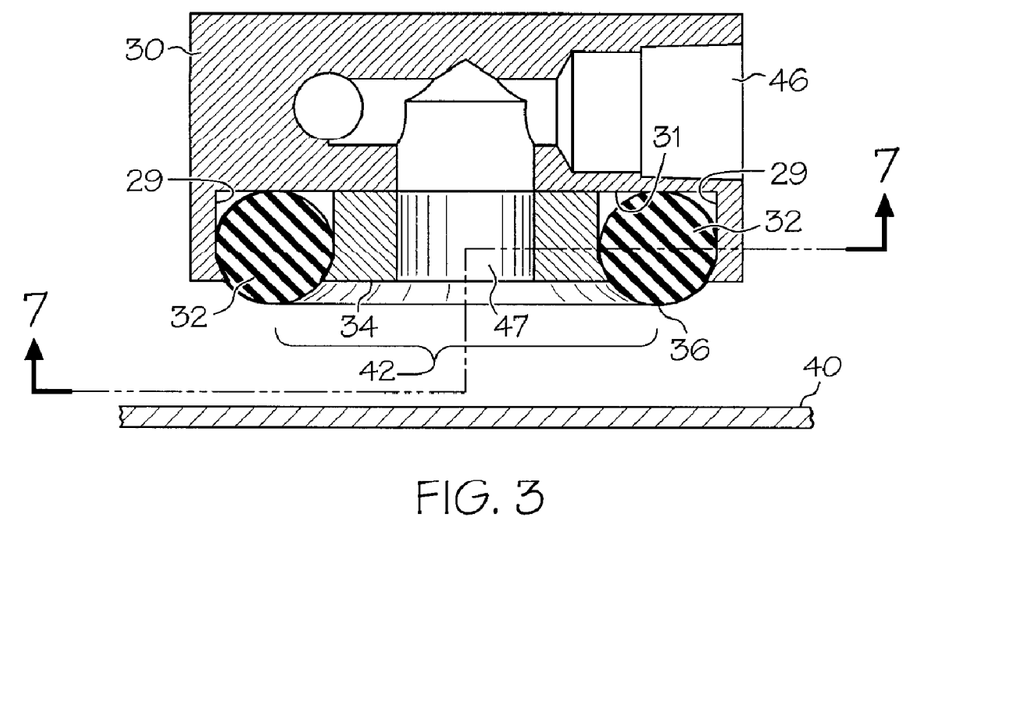
FIG. 3 is a cross-sectional schematic illustration of one embodiment of the lifting device of the present invention prior to contact with an article to be moved.

FIG. 3 illustrates one embodiment of the lifting device of the invention, which includes an external housing 30 and an internal housing 34 for receiving an elastomeric gasket 32. As illustrated, the elastomeric gasket 32 has an outer side or contact surface 36 which protrudes past the front face of the housings 30, 34, allowing the elastomeric gasket 32 to come into contact with an article 40 to be moved. The external housing 30 also includes an inner wall 29, an inner surface 31, and a passage 46 extending therethrough for connection to a negative pressure supply source. Typically the elastomeric gasket 32 is disposed within a groove or circuit created by the joining of the external and internal housings.

Figure 4:
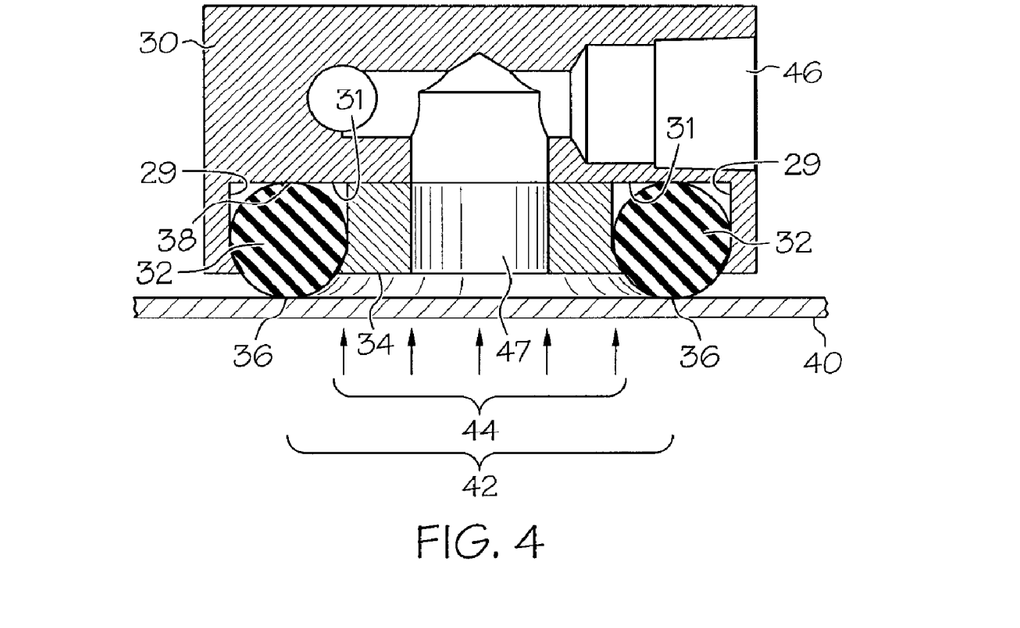
FIG. 4 is a cross-sectional schematic illustration of the device of FIG. 3 during contact with the article to be moved.

FIG. 4 illustrates negative pressure being applied through the passage 46. When negative pressure is applied, a vacuum attachment force 44 is created within the vacuum area 42 provided by the elastomeric gasket 32, the inner seal surface 38 of the elastomeric gasket 32 is brought into engagement with the inner surface 31 of the external housing 30, and the outer contact surface 36 of the elastomeric gasket 32 is brought into engagement with the article 40 to be moved. In this manner, the vacuum attachment force 44 holds the article 40 against the contact surface 36 of the elastomeric gasket 32 in position until the negative pressure coming through the passage 46 is vented, relieved or otherwise removed. Since, during each transfer operation, the contact surface 36 of the elastomeric gasket 32 does not collapse as compared to the collapse of the lip portion of the prior art suction cup of FIGS. 1 and 2, wear-and-tear of the contact surface 36 does not decrease the strength of the vacuum seal as quickly as it does with the prior art suction cup. Rather, typically wear-and-tear of the contact surface 36 will cause the cross-sectional area of the contact surface 36 to increase with time as the surface gradually erodes, the surface 36 going from having a rounded surface to one that is flat prior to needing replacement.

Figures 5A, 5B:
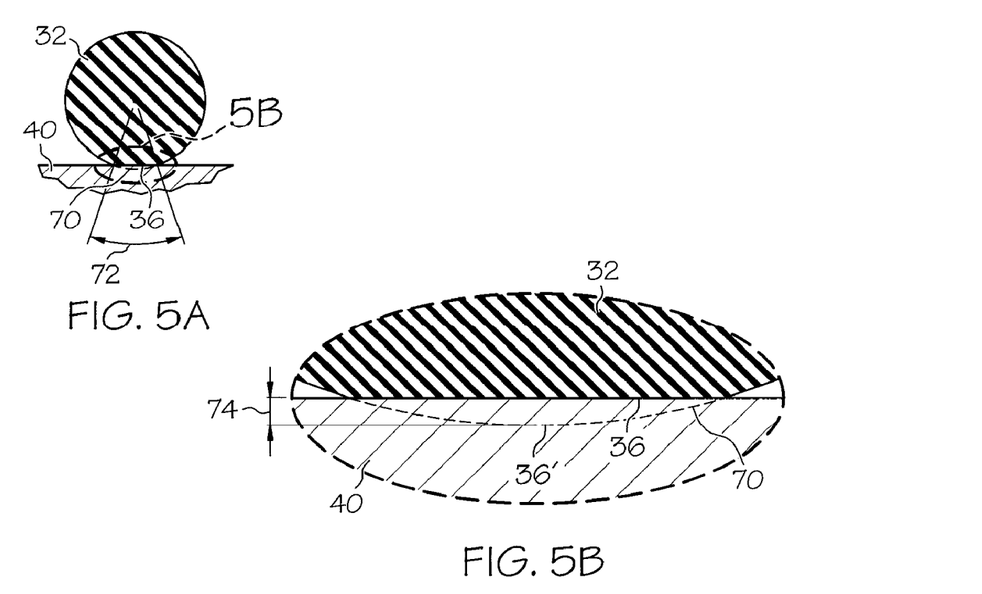
FIGS. 5A and 5B are schematic views of the cross-sectional diameter of a gasket, showing deformation of the gasket during contact with an article to be moved.

FIGS. 5A and 5B are schematic cross-sectional views through the gasket 32 of the invention, showing the deformation of the outer surface of the gasket 32 during contact with an article 40 to be moved to define a contact surface 36. FIGS. 5A and 5B illustrate two ways in which the amount of deformation of the contact surface 36 can be measured. As shown in FIG. 5A, the cross-sectional contact surface 36 can be defined as a portion 72 of the circumference of the gasket 32, measured in degrees of arc. Typically the angle of arc 72 ranges from between about 5° to about 60°. FIG. 5B is an enlarged portion of FIG. 5A, and more clearly shows an amount of deformation 74 of the gasket 32 during contact with the article 40 to be moved. Deformation of the gasket 32 can be appreciated by comparing the contact surface 36 during contact with the article 40 to be moved with the contact surface 36' prior to contact. Here, it is easier to visualize the amount of deformation of the gasket 32 as a proportion or percentage of the total cross-sectional diameter of the gasket 32. Typically, the percentage of the gasket's cross-sectional diameter that is deformed as shown by deformation 74 ranges from between about 1% to about 20%.

Further, in contrast to the prior art suction cup 10 (FIGS. 1 and 2), where the lips 18 of the cup collapse under the vacuum attachment force 24 and thereby decrease the vacuum area 22, the vacuum area 42 of the present invention (FIGS. 3 and 4) is not significantly reduced in size against the vacuum attachment force 44 because there is typically minimal deformation of the contact surface 36 of the elastomeric gasket 32. This provides an improved seal between the contact surface 36 and the article 40 to be moved, and, since there is no buckling or collapse of the contact surface 36 under the pressure of the vacuum attachment force 44, there is less wear and tear of the elastomeric gasket 32 over time, thus leading to a longer working life of the system before replacement of the elastomeric gasket is needed.

Figure 6:
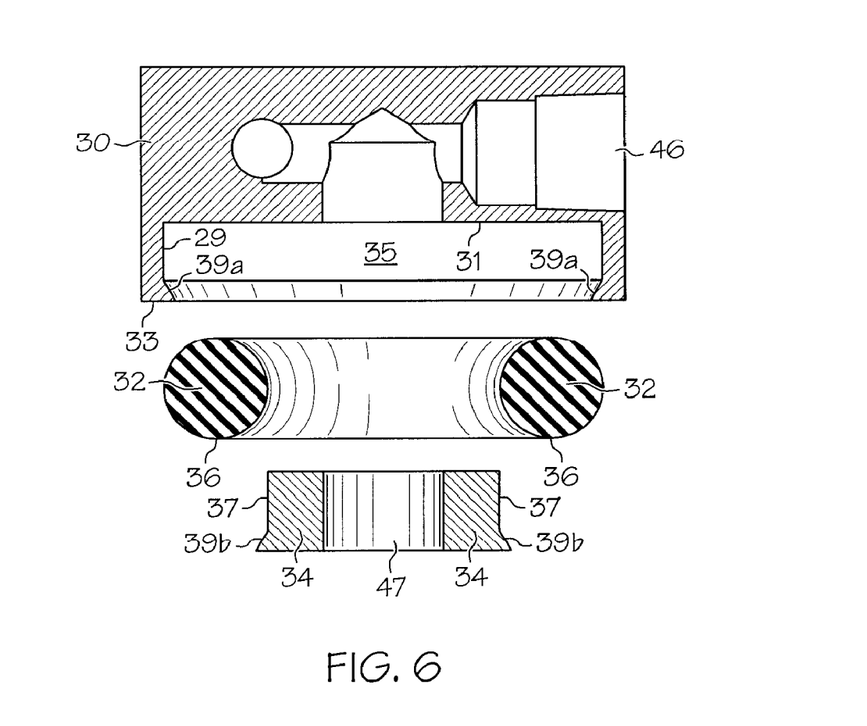
FIG. 6 is an exploded cross-sectional schematic illustration of the device of FIG. 3.
Figure 7:
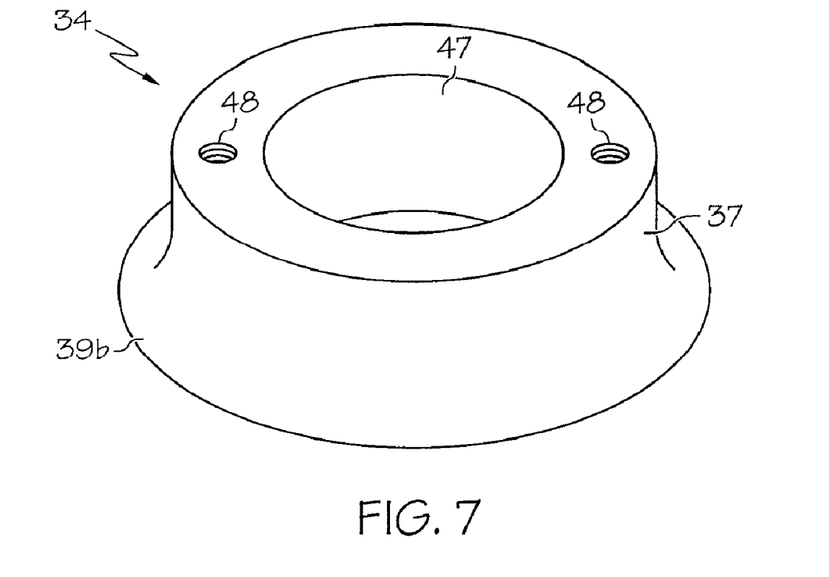
FIG. 7 is a perspective view of one embodiment of the internal housing of the device.
Figure 10A:
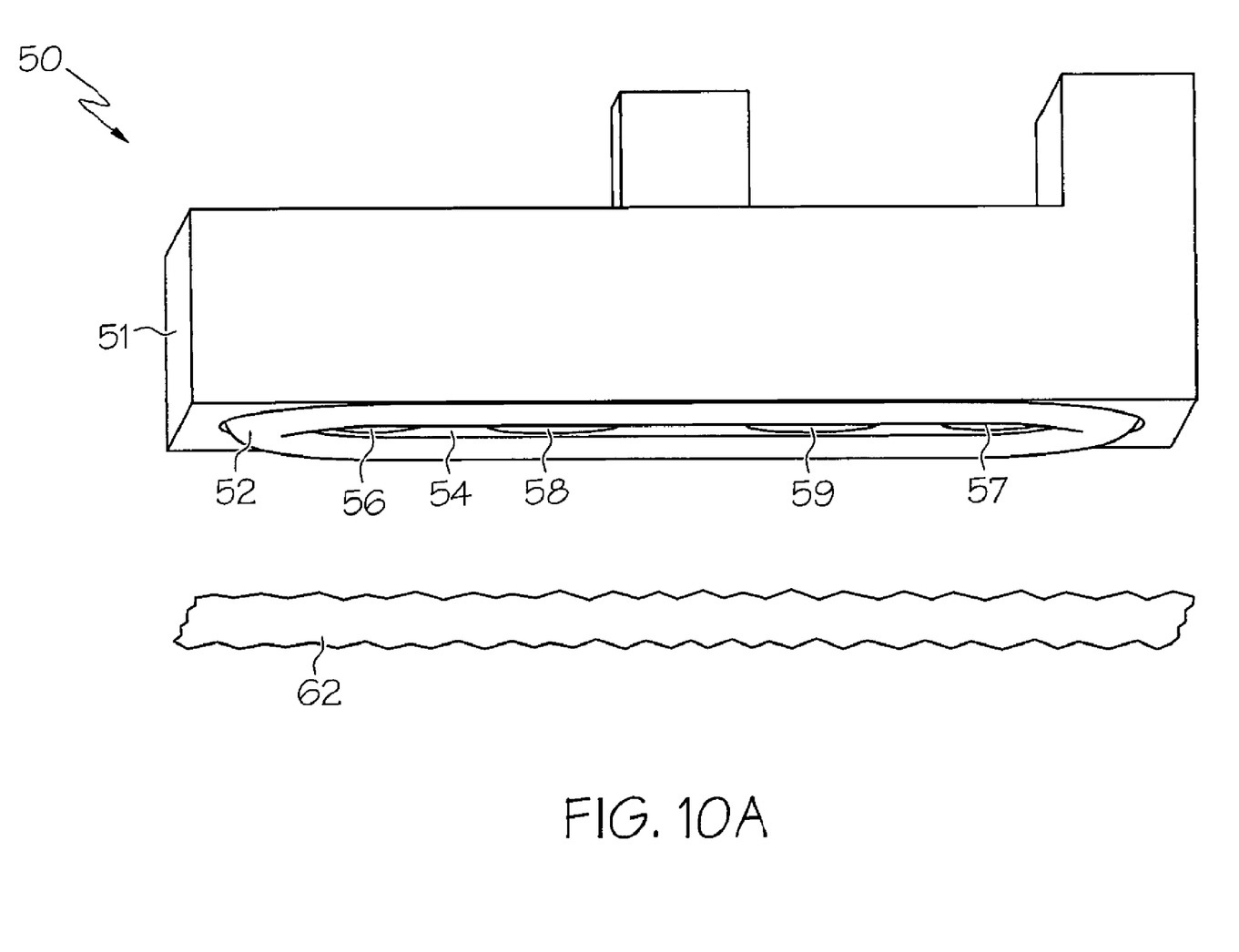
FIG. 10A is a perspective view of one embodiment of the device of the invention in which the elastomeric gasket has a "race track" shape.
Figure 10B:
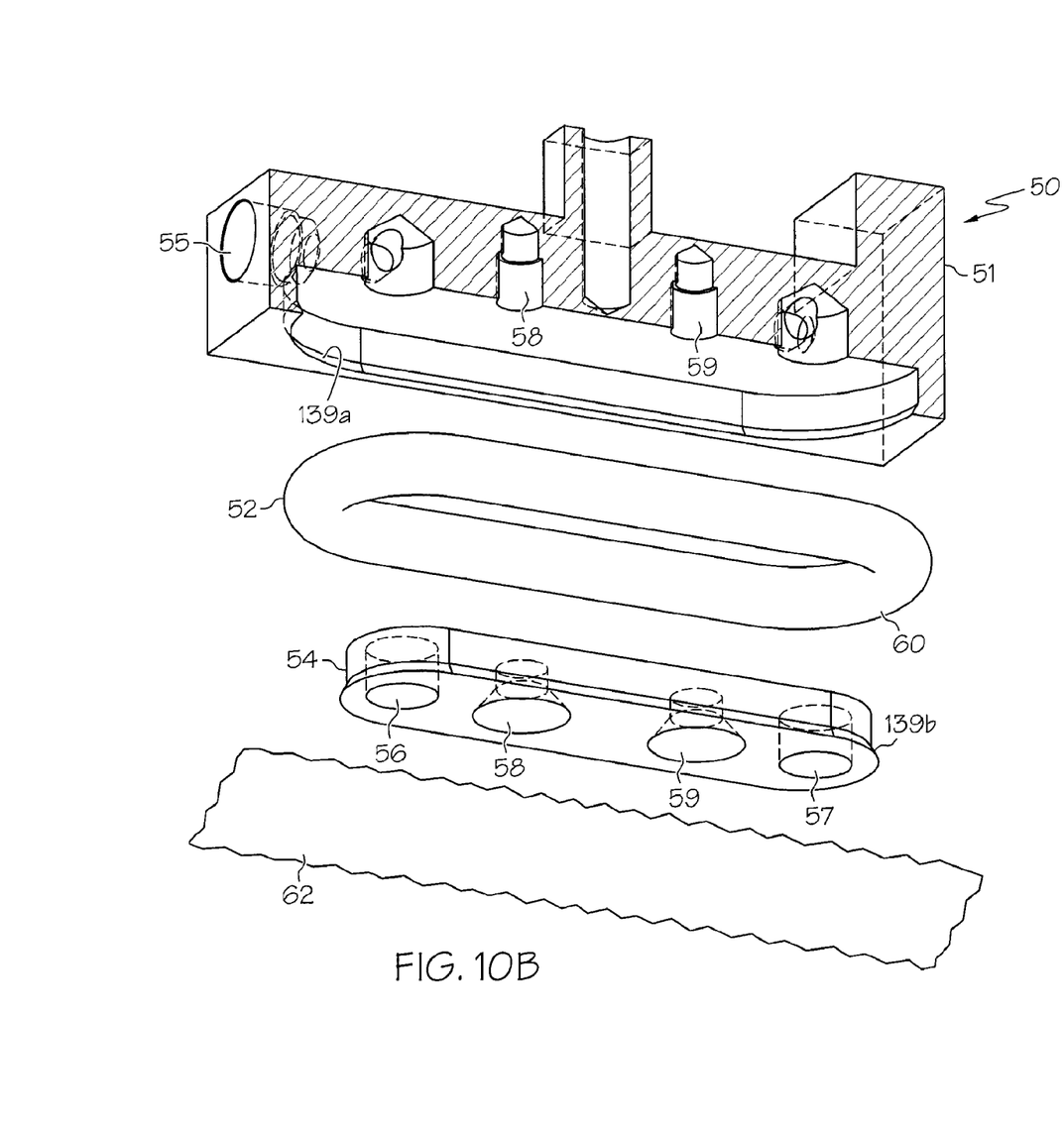
FIG. 10B is an exploded plan view of the embodiment in FIG. 10A.

FIG. 6 is an exploded cross-sectional schematic illustration of the device, showing the external housing 30, the elastomeric gasket 32, and the internal housing 34. The inner surface 31, the inner wall 29, and the distal end 33 of the external housing 30 define a vacuum compartment 35 which is typically in fluid communication with the passage 46 of the external housing 30. Typically the external housing 30 and the internal housing 34 are bolted, as illustrated in FIGS. 7, 10A and 10B, or otherwise connected to one another by some other mechanical fastening means, such as by being snapped together, pinned, latched, glued, "gun-locked" (twisting motion), etc. as is known in the art. The internal housing includes an outer surface 37 and a central surface 47. The outer surface 37 of the internal housing 34, along with the inner surface 31 and the inner wall 29 of the external housing 30, come together to create a groove circuit that connects or interfaces with the elastomeric gasket 32. Thus, the association of the internal housing 34 with the external housing 30 forms the groove circuit, which determines the shape of the elastomeric gasket 32. Further, typically either the inner wall 29 of the external housing, or the outer surface 37 of the internal housing, or both (as illustrated in FIG. 6), includes a retaining member, typically in the form of an externally extending lip, 39a or 39b, which protrudes into the vacuum compartment 35 at the distal end 33 and retains the elastomeric gasket 32 within the groove circuit.

FIG. 7 is a perspective view of the internal housing 34 of the lifting device, illustrating the projection of externally extending lip 39b at the distal edge of the outer surface 37. In addition to the outer surface 37 and the lip 39b, the internal housing includes the central surface 47, and holes 48 which accommodate bolts for securing the internal housing 34 to the external housing. The outer surface 37 of the internal housing 34 can be rounded, as illustrated, or otherwise tailored to accommodate a portion of the contact surface of an elastomeric gasket. The externally extending lip 39b is typically shaped to allow the elastomeric gasket to protrude axially at least about 5%, and not more than about 40%, of its cross-sectional diameter beyond the distal end 33 of the external housing. The elastomeric gasket can have either regular and irregular shapes depending on the shape of the groove circuit, including the shape of an O-ring (e.g. for fitting a circular groove circuit), a race track, a triangular shape, an L-shape, a cutout shape, an oval shape, and variations thereof, as illustrated in FIGS. 9A-C and FIGS. 10A-B, below.

Figure 8:
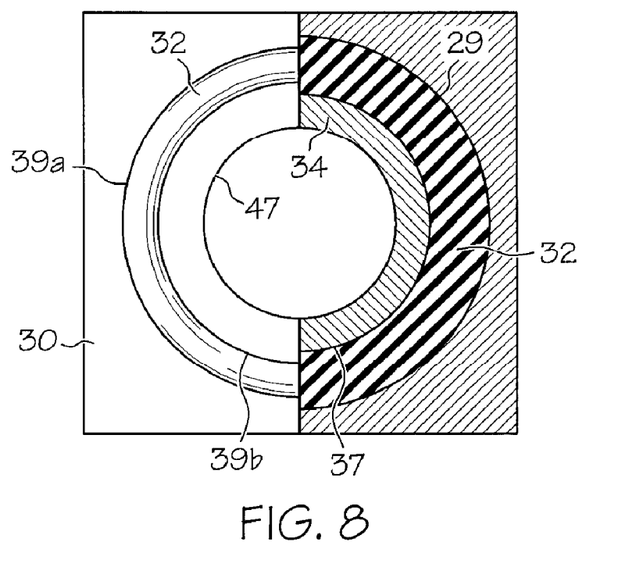
FIG. 8 is a cross-sectional view through line 7-7 of the lifting device of FIG. 3.

FIG. 8 is a cross-sectional view through line 7-7 of the lifting device of FIG. 3, as seen from the underside of the lifting device, illustrating the relationship between the external housing 30, the internal housing 34 and the elastomeric gasket 32. Looking through the cross-section on the right side of FIG. 8, the elastomeric gasket 32 sits within the groove circuit created by the joining of the external housing 30 and the internal housing 34. As illustrated, the groove circuit is the space between the inner wall 29 of the external housing and the outer surface 37 of the internal housing. As best seen on the left side of FIG. 8, the externally extending lips 39a, 39b serve to make contact with the elastomeric gasket 32 and retain it within the groove circuit. As noted above, the contact surface 60 of the elastomeric gasket 32 protrudes from the distal end of the external housing 30. The area within the central surface 47 of the internal housing 34 leads to the passage within the external housing.

Figure 9A:
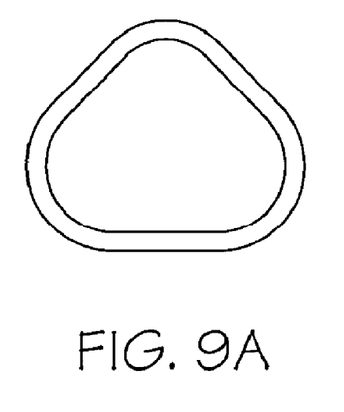
FIGS. 9A-9C are schematic views of the various shapes available for the elastomeric gasket.
Figure 9B:
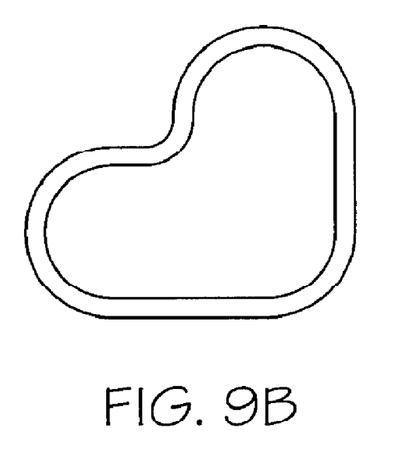
Figure 9C:
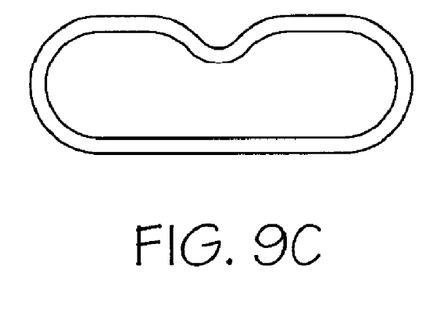

The elastomeric gasket 32, which is retained in the groove circuit created by the joining of the external housing 30 and the internal housing 34, can have, in plan view, a circular shape, a non-circular shape, or of any shape required for proper lifting of an article to be moved. As non-limiting examples, FIGS. 9A-C illustrate alternative shapes for the elastomeric gasket, specifically a triangular shape (FIG. 9A), an L-shape (FIG. 9B), and an ovular shape having a cutout portion (FIG. 9C). The elastomeric gasket is typically a stock, standard item requiring no special machining or molding to manufacture.

No matter the shape, the elastomeric gasket can be manufactured out of any material, such as, but not limited to, natural rubber (natural polyisoprene), butadiene rubber, butyl rubber, chlorinated polyethylene, chlorosulfonated polyethylene, epichlorohydrin rubber, ethylene acrylic, ethylene propylene rubber, fluorocarbon rubber (such as Viton®), fluorosilicone, synthetic isoprene rubber, neoprene rubber, nitrile rubber (NBR), phosphonitrilic fluoroelastomer, polyacrylate rubber, silicone rubber, polysulfide rubber, polyurethane rubber, buna, flexible PVC, or any equivalent flexible material that provides a seal between the housing and the article to be moved. The variety of materials available allows a gasket to made that it not too soft, so that it will not be overly deformed or compressed within the housing to cause the housing to "bottom out" on the article to be lifted, and not too hard, so that there is no difficulty in forming and maintaining a good seal between the gasket's contact surface and the article to be lifted.

The elastomeric gasket is intended to be quickly and easily interchangeable, for example from one made of natural rubber to one made of flexible PVC, so that elastomeric gaskets having different physical properties can be inserted depending on the intended use of the lifting device. In addition, when the contact surface of the elastomeric gasket does begin to show signs of wear, the ring can simply be flipped or turned over to expose the other side of the ring as the contact surface, so that the elastomeric gasket has an extended life compared to prior art suction cup devices.

With an elastomeric gasket having a non-circular shape, the groove circuit created by the external and internal housings will typically have the same shape as the elastomeric gasket. This is illustrated in FIGS. 10A and 10B, which illustrate one embodiment of the lifting device 50 wherein the elastomeric gasket 52 has a non-circular shape in the pattern of a "race track." In this embodiment, the external housing 51 and the internal housing 54 retain the elastomeric gasket 52 within the race track-shaped groove circuit. As illustrated in detail in FIG. 10B, the passage 55 provides suction via a first vacuum area 56 and a second vacuum area 57. The internal housing 54 is secured to the external housing via bolts, which pass through bolt holes 58, 59. The external housing 51 includes a retaining member or externally extending lip, 139a, and the internal housing includes externally extending lip 139b. These lips retain the elastomeric gasket 52 within the groove circuit. As illustrated, the elastomeric gasket 52 has an outer side or contact surface 60 which protrudes past the lips 139a, 139b and past the distal end of the external and internal housings 51, 54, and allows the elastomeric gasket 52 to come into contact with an article 62 to be moved.

Figure 11:
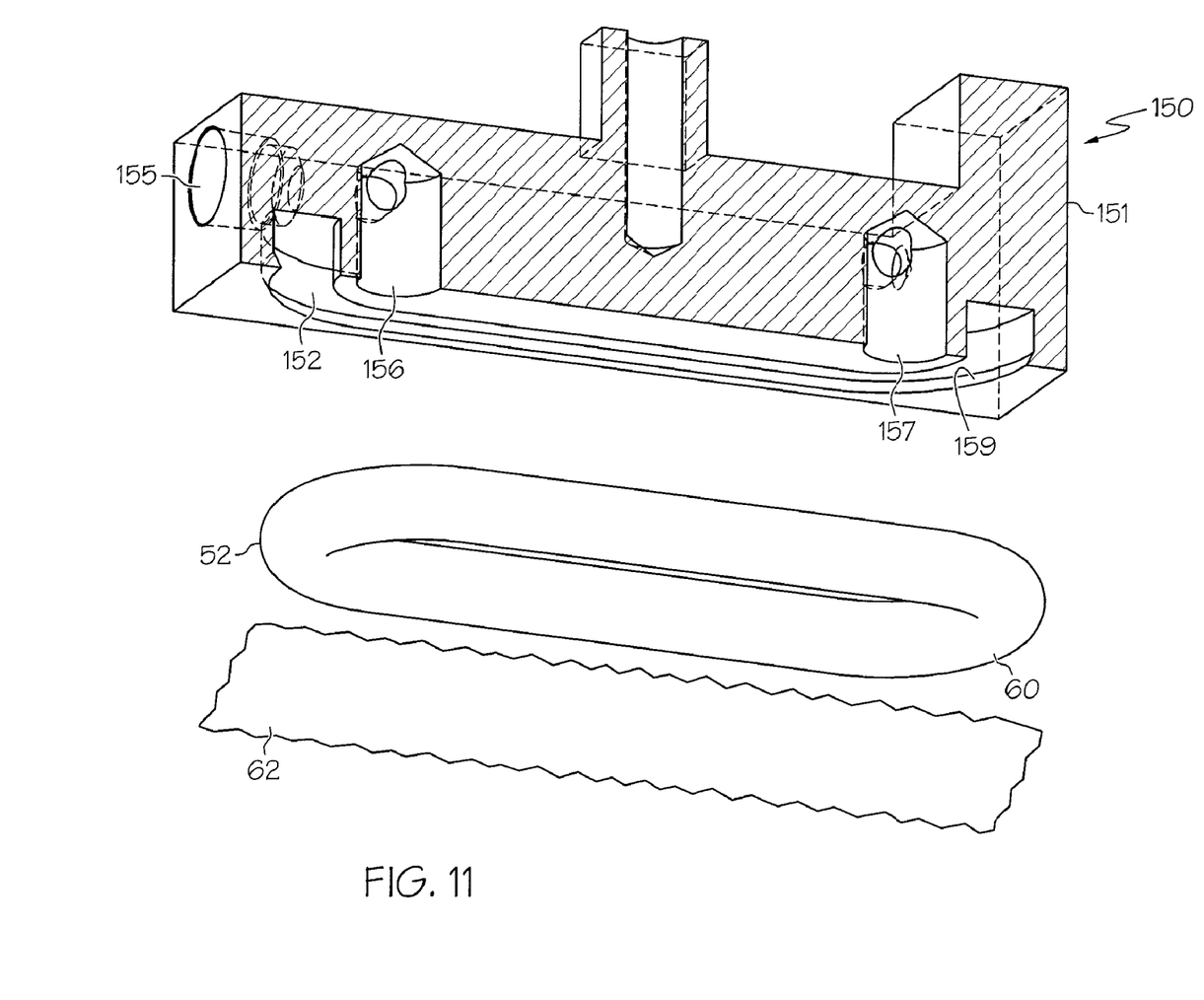
FIG. 11 is an exploded plan view of another embodiment of the device of the invention in which the gasket is held within a unitary housing structure.

In another embodiment 150 of the invention, illustrated in FIG. 11, the housing for the elastomeric gasket is a unitary housing structure 151. In such an embodiment, the unitary housing structure 151 receives the elastomeric gasket 52 within a groove circuit 152 within the unitary housing structure 151, similar to the groove circuit created by the combination of the external housing and internal housing in the embodiment of FIGS. 3-8. Passage 155 provides suction via a first vacuum area 156 and a second vacuum area 157. There is no internal housing in this embodiment, rather, the housing 151 is a solid structure Since the elastomeric gasket 52 is typically made of a flexible material, the gasket can be pressed, pushed or otherwise squeezed into the groove circuit 152 by a user, and it will be retained there by the externally extending lip 159. When the contact surface of the elastomeric gasket needs replacement, the gasket can be removed by prying it out with a lever or other small prying instrument. However, unlike the embodiment of FIG. 10, where there are two sets of externally extending lips (139a, 139b, FIG. 10), the unitary housing structure 150 of FIG. 11 will typically have only one externally extending lip, 159, so that the user can more easily insert and remove the gasket. Alternatively, the embodiment having a unitary housing can also include two sets of externally extending lips for retaining the elastomeric gasket 52 within the groove circuit 152. This embodiment can provide a lifting device with less total parts, thus increasing the ease of maintenance of the device over time.

The lifting device of the invention is very simple in construction and sensitive in operation, so that it may be readily employed in various locations for operation upon sheets of various material and thickness. The invention provides an improved area of contact between the contact surface and the article to be moved, such that the lifting device incurs less wear and tear while the area exposed to vacuum is not decreased during the attachment of the lifting device to the article being moved. Thus, the lifting device has a longer working life over time, and during operation the same vacuum attachment force is in effect from initial contact to full "grip" between the lifting device and the article to be moved, providing a more durable seal that extends the life of the system. The elastomeric gasket also provides an extended life for the lifting device as compared to prior art suction cup devices, less down time of the equipment, and a more reliable operation by providing a larger surface on which wear can act. Typically the lifting device of the invention is on a moving or mechanical or servo-driven robotic arm which is mounted inside a mechanism/machine which moves the article. Replacing this element puts the operator in harms way The less the mechanism needs to be maintained, the less risk there is to the operator when running/maintaining the machine.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope or spirit of the invention.

I claim:

1. A lifting device for use in transferring an article, comprising:
  a) an external housing including a passage, an inner surface, an inner wall and a distal end, the passage extending through the external housing for connection to a negative pressure supply source that applies a vacuum attachment force, the inner surface and inner wall defining a vacuum compartment in fluid communication with the passage; and
  b) an internal housing including an outer surface, the internal housing connected with the external housing within the vacuum compartment to form a groove circuit therebetween, the groove circuit defined by the inner wall of the external housing and the outer surface of the internal housing, and wherein at least one of the inner wall of the external housing or the outer surface of the internal housing includes a retaining member that extends into the groove circuit to retain an elastomeric gasket secured within the formed groove circuit, wherein the groove circuit positions a contact surface of the inserted elastomeric gasket, which makes contact with an article to be transferred under the vacuum attachment force, to protrude axially beyond the distal end of the external housing.

2. The lifting device of claim 1, wherein the inner wall of the external housing is perpendicular to the inner surface, and parallel with the outer surface of the internal housing.

3. The lifting device of claim 1, wherein the elastomeric gasket protrudes axially at least about 5%, and not more than about 40% of its cross-sectional diameter beyond the distal end of the external housing when retained within the groove circuit.

4. The lifting device of claim 1, wherein the groove circuit is circular and the elastomeric gasket is an O-ring.

5. The lifting device of claim 1, wherein the groove circuit has a non-circular shape, including a shape selected from the group consisting of a triangular shape, an L-shape, an ovular shape having a cutout portion, and a racetrack shape.

6. The lifting device of claim 5, further comprising the elastomeric gasket.

7. The lifting device of claim 1, wherein the internal housing includes the retaining member that includes an externally extending lip.

8. The lifting device of claim 1, wherein both the inner wall of the external housing and the outer surface of the internal housing include the retaining member that includes an extending lip.

9. The lifting device of claim 1, further comprising the elastomeric gasket.

10. The lifting device of claim 9, wherein the elastomeric gasket material is selected from the group consisting of natural rubber, natural polyisoprene, butadiene rubber, butyl rubber, chlorinated polyethylene, chlorosulfonated polyethylene, epichlorohydrin rubber, ethylene acrylic, ethylene propylene rubber, fluorocarbon rubber, fluorosilicone, synthetic isoprene rubber, neoprene rubber, nitrite rubber, phosphonitrilic fluoroelastomer, polyacrylate rubber, silicone rubber, polysulfide rubber, polyurethane rubber, buna, flexible polyvinyl chloride, and equivalent flexible materials.

11. The lifting device of claim 9, wherein deformation of the contact surface of the elastomeric gasket during contact with the article to be moved ranges from between about 1% to about 20% of the circumferential cross-section of the gasket.

12. A vacuum lifting device for use in transferring an article, comprising:
 a) an external housing including a passage extending therethrough for connection to a negative pressure supply source, an inner surface, an inner wall and a distal end, the negative pressure supply source adapted to apply a vacuum attachment force, the inner surface and inner wall defining a vacuum compartment in fluid communication with the passage; and
 b) an internal housing including an outer surface, the internal housing connected with the external housing within the vacuum compartment to form a groove circuit therebetween defined by the inner wall of the external housing and the outer surface of the internal housing, to retain an elastomeric gasket securable within the groove circuit and including a contact surface that protrudes axially beyond the distal end of the external housing for making contact with an article to be transferred under the vacuum attachment force,
  wherein the elastomeric gasket defines a vacuum area in response to application of the vacuum attachment force by the negative pressure supply source; and
  wherein the groove circuit has a non-circular shape, including a shape selected from the group consisting of a triangular shape, an L-shape, an ovular shape having a cutout portion, and a racetrack shape.

13. The lifting device of claim 12, wherein the vacuum area does not decrease under the pressure exerted by the vacuum attachment force.

14. The lifting device of claim 12, wherein the elastomeric gasket protrudes axially at least about 5%, and not more than about 40% of its cross-sectional diameter beyond the distal end of the external housing when retained within the vacuum compartment.

15. The lifting device of claim 12, wherein both the inner wall of the external housing and the outer surface of the internal housing include a retaining member that extends into the groove circuit, the retaining member including an extending lip.

16. The lifting device of claim 12, further comprising the elastomeric gasket.

17. The lifting device of claim 16, wherein the elastomeric gasket material is selected from the group consisting of natural rubber, natural polyisoprene, butadiene rubber, butyl rubber, chlorinated polyethylene, chlorosulfonated polyethylene, epichlorohydrin rubber, ethylene acrylic, ethylene propylene rubber, fluorocarbon rubber, fluorosilicone, synthetic isoprene rubber, neoprene rubber, nitrile rubber, phosphonitrilic fluoroelastomer, polyacrylate rubber, silicone rubber, polysulfide rubber, polyurethane rubber, buna, flexible polyvinyl chloride, and equivalent flexible materials.

18. The lifting device of claim 16, wherein deformation of the contact surface of the elastomeric gasket during contact with the article to be moved ranges from between about 5° to about 60° of a portion of the circumference of the gasket.

19. The lifting device of claim 16, wherein deformation of the contact surface of the gasket during contact with the article to be moved ranges from between about 1% to about 20% of the circumferential cross-section of the gasket.

\* \* \* \* \*